United States Patent [19]

Pepper, Jr.

[11] 4,430,917

[45] Feb. 14, 1984

[54] HAND-HELD MUSICAL INSTRUMENT AND SYSTEMS INCLUDING A MAN-MACHINE INTERFACE APPARATUS

[75] Inventor: William Pepper, Jr., Bethesda, Md.

[73] Assignee: Peptek, Incorporated, Bethesda, Md.

[21] Appl. No.: 68,802

[22] Filed: Aug. 22, 1979

[51] Int. Cl.$^3$ .......................... G10H 1/18; G10H 1/46
[52] U.S. Cl. ...................................... 84/1.01; 84/1.27; 84/DIG. 7
[58] Field of Search ................. 84/1.01, 1.24, DIG. 7, 84/DIG. 1, 1.1, 1.27; 338/69; 340/365 C, 365 A

[56] References Cited

U.S. PATENT DOCUMENTS

| | | | |
|---|---|---|---|
| 2,873,637 | 2/1959 | Herold | 84/DIG. 7 |
| 3,624,583 | 11/1971 | Nakada | 84/1.24 X |
| 3,694,559 | 9/1972 | Suzuki et al. | 84/1.01 |
| 3,965,789 | 6/1976 | Pearlman | 84/1.24 |
| 4,058,045 | 11/1977 | Jennings et al. | 84/DIG. 1 |
| 4,071,691 | 1/1978 | Pepper, Jr. | 340/364 C X |
| 4,129,747 | 12/1978 | Pepper, Jr. | 340/365 C X |

Primary Examiner—Stanley J. Witkowski
Attorney, Agent, or Firm—Jim Zegeer

[57] ABSTRACT

A hand-held electronic musical instrument and system has a plurality of resistance elements that have adjacent thereto indentations or notches, or other tactile structures for locating discrete notes. Each resistance element is connected to a circuit for translating the position of the musician's finger on the element into an electrical signal, the frequency of the signal corresponding to the position touched. Transducers convert the electrical signals into sounds, which are modified by an acoustic cavity within the instrument. At least one control panel is provided on a side of the instrument engaged by the thumb or thumbs of the musician, each control panel also being a one-dimensional touch panel with the control axis perpendicular to the long axis of the panel so that the musician's thumb can slide along the panel parallel to the long axis without changing its position in the control axis. The musician controls the volume of the sound by adjusting the position of the thumb transverse to the instrument.

6 Claims, 7 Drawing Figures

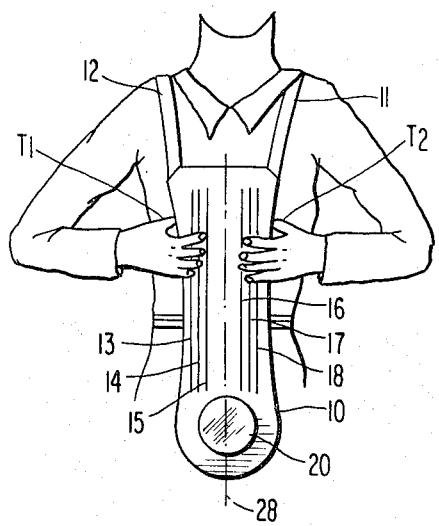
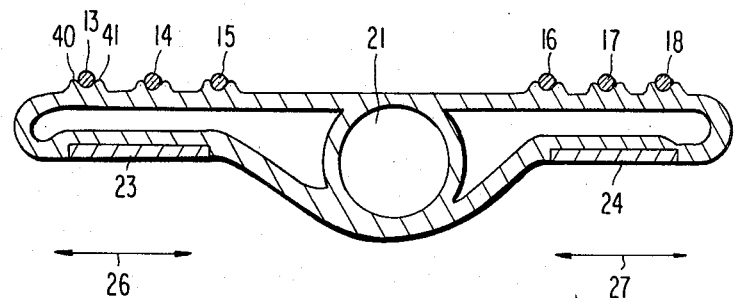
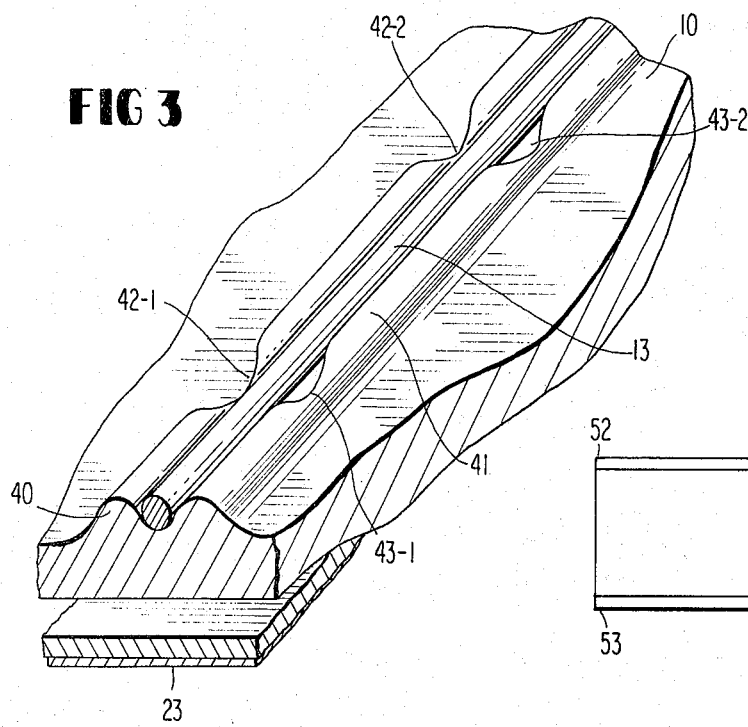
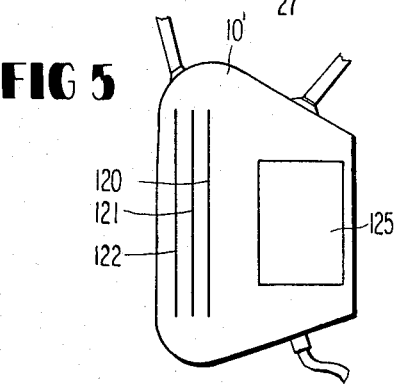
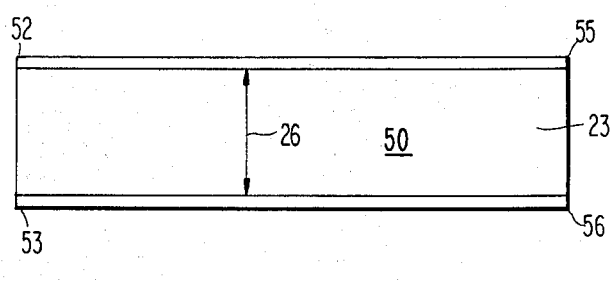
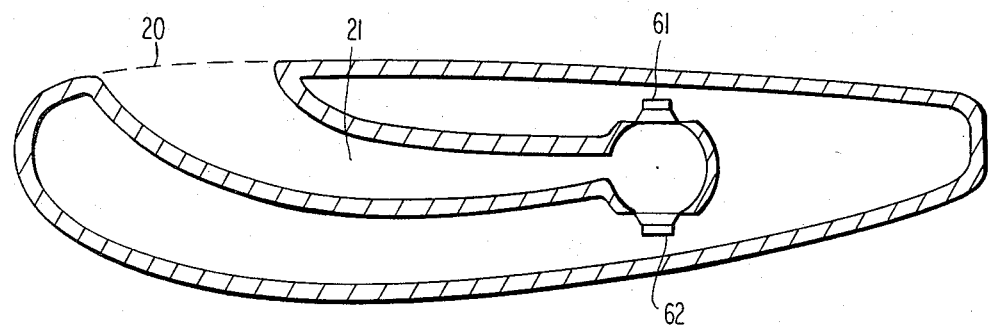

HAND-HELD MUSICAL INSTRUMENT AND SYSTEMS INCLUDING A MAN-MACHINE INTERFACE APPARATUS

BACKGROUND OF THE INVENTION

In an article entitled "The Trazor ™—A New Input Device" by the inventor hereof and A. J. Rider, published in "Gametronics Proceedings" Volume 1, January 1977, pages 115-120, reference was made to ways to make electronic musical instruments that would be easier to play than most musical instruments, and a musical instrument was hypothesized having a two-dimensional control surface that would generate tones whose pitch corresponded to finger position in one axis, and whose tone qualtiy, or timbre corresponded to finger position in the other axis and, further that such musical instrument could have a second such control surface used by the other hand to control loudness and vibrato.

BRIEF DESCRIPTION OF THE INVENTION

The present invention is an improvement on the musical instrument referred to above and is directed to a novel handheld electronic musical instrument and system utilizing touch panel technology as disclosed in my application, Ser. No. 14,450, filed Feb. 23, 1979, now U.S. Pat. No. 4,293,734 my U.S. Pat. Nos. 4,071,691 and 4,129,747, and my application Ser. No. 867,256, filed Jan. 5, 1978 now U.S. Pat. No. 4,198,539 and entitled "System for Producing Electrical Fields having Predetermined Characteristics," all of which are incorporated herein by reference.

According to this invention, the musical instrument includes a frame member which has mounted on one or more surfaces a plurality of one-dimensional touch panel elements, each element constituting a note-producing touch member for the fingers of the hand to touch; electronic circuitry coupled to the note-producing touch members for translating the position touched into an electrical signal of frequency corresponding to the pitch of the note to be played; and a thumb control panel for each thumb on further surfaces of the frame, the thumb control panels each being constituted by a resistive surface, such thumb control panels being used to control the timbre or volume or both for one or both sets of members. A preferred combination is to have the left note-producing touch members provide basic accompaniment, the left thumb control the volume of all sounds produced by touching the note-producing touch members, the right note-producing touch members play melody, and the right thumb control the timbre of the right note-producing touch members only. However, it will be appreciated that any other combination may be utilized.

In the preferred embodiment the body of the instrument contains an acoustical cavity with a separate transducer for each note-producing member, said transducer converting electrical signals into acoustic energy. The reason for using separate transducers is to avoid problems of intermodulation distortion common in small loudspeakers. It will be appreciated that the same purpose can be served by using a single transducer of adequate quality. The function of the acoustical cavity is to modify the electronically generated sounds from the transducers to provide some of the subtlety and richness provided by the acoustical cavities of conventional instruments such as those of the woodwind, brass, and string families. It will be appreciated that the shape, materials and construction of the acoustical cavity can be varied to produce instruments with a wide variety of timbres, some similar to existing instruments and some unique. The timbre of the instrument can also be modified by changing the characteristics of the electrical signals with voicing circuits under the control of the musician. An opening couples the acoustic energy from the cavity to the surrounding environment. It will be appreciated that it may be desirable to employ more than one acoustic cavity to provide different and contrasting musical effects with the same instrument. Furthermore, it may be desirable for the acoustical cavity to be physically located separately from the instrument used by the musician to generate electrical signals. Accordingly, the object of the invention is to provide an improvement in hand-held electronic musical instruments and systems that is extremely versatile, easy to play, and has no moving parts.

BRIEF DESCRIPTION OF THE DRAWINGS

The above and other objects, advantages and features of the invention will become more apparent when considered with the following specification taken in conjunction with the accompanying drawings wherein:

FIG. 1 is a front view of a hand-held musical instrument incorporating the invention;

FIG. 2 is a cross-sectional view taken on the lines 2-2 of FIG. 1, showing the relative positions of the note-producing touch members and the control panels;

FIG. 3 is an enlarged isometric view of the note-producing members and ridges with their respective indentations or notches;

FIG. 4 is a top plan view of one thumb control panel;

FIG. 5 is a front elevation view of a modification of the instrument showing an electronic drum for accompanying the melody;

FIG. 6 is a cross-sectional view taken on axis 28 of FIG. 1, showing the acoustical cavity.

DETAILED DESCRIPTION

Figure 7:
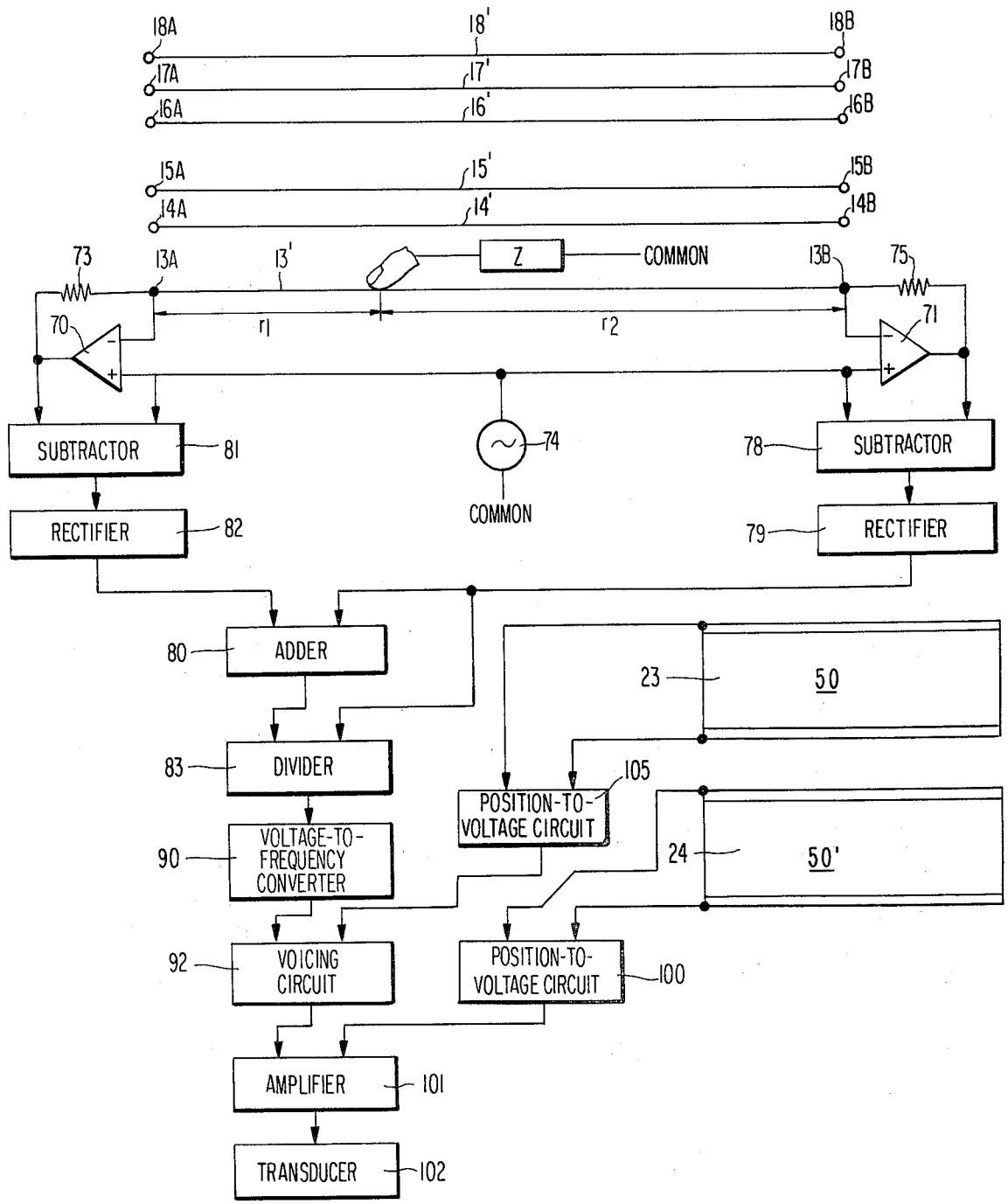
FIG. 7 is a schematic block diagram of the electrical circuitry utilized for translating positions touched to electrical signals for operating transducers such as loudspeakers.

As shown in FIG. 1, the musical instrument according to the invention is constituted by a frame 10 having straps 11 and 12 for carrying same by the user, it being obvious that such straps are not necessary and that the instrument can be mounted on a stand, table, or other support if desired. The front of the instrument also has an opening 20 leading to an acoustical cavity incorporating transducers for converting electrical signals produced by the instrument to audible musical notes.

Each note-producing touch member 13-18 is a one-dimensional body current touch panel as disclosed in my above-identifed application Ser. No. 014,450, filed Feb. 23, 1979, and now U.S. Pat. No. 4,293,734. Thumb control panels 23-24 (FIG. 2) are also one-dimensional touch panels with the control axis 26 and 27 of each thumb control panel 23 and 24 being perpendicular to the long axis 28 of the instrument. However, it will be appreciated that other orientations may be easily incorporated into musical instruments incorporating the basic principles of the invention. In the disclosed preferred arrangement, the thumb control panels 23-24 are oriented as described so that the thumbs T1 and T2 of the musician can slide along the respective thumb panels 23 and 24 parallel to the long axis 28 without changing position in the control axis 26 or 27, respectively. Note-producing touch members 13-18 control the pitch, and the thumb control panels 23, 24 control the volume of the notes played by each hand, or, if preferred, one thumb control panel can control the volume of all the notes and the other thumb control panel can change the sound quality, or timbre, of the notes. A preferred combination is to have the left note-producing touch members 16, 17 and 18 provide bass accompaniment, the left thumb T2 control the volume of all note-producing touch members, the right note-producing touch members 13, 14 and 15 play melody, and the right thumb control panel 23 control sound quality of the right note-pitching touch members only. However, it is intended that other arrangements be easily adapted within the context of the present invention. For example, it is not necessary that the thumb control panels be operated by the thumb or even that they be present at all.

Each of the note-producing touch members is an extended resistive element such as nichrome wire wound on a mandrel, and corresponds to one of the resistance elements shown in FIG. 7. The thumb control panels 23 and 24 (panel 23 being shown in an enlarged view in FIG. 4) are functionally similar to the note-producing touch members but the short dimension corresponds to the long dimension of the note-producing touch members, as shown in FIG. 4. The thumb control panels comprise rectangles of uniform resistive material having a resistive touch surface 50,50', which is the surface part to be contacted by the thumb, and conductive strips 52 and 53 along each of the long edges. Connecting wires 54, 55 connect the unit in a circuit to be described in connection with FIG. 7.

With reference to FIGS. 1 and 2, it will be noted that the note-producing touch members are spaced and run along parallel predetermined paths. However, it is also evident that the resistance elements of these note-producing touch members need not be straight nor do they even need to be parallel and, with proper insulation, can cross over one another, if desired, to produce unusual musical effects.

Each of the note-producing touch members is confined between a pair of ridges; in the exemplary isometric shown in FIG. 3 a resistance element 13 is shown as confined between ridges 40 and 41. At least one of the ridges is provided with a plurality of spaced notches, indentations, or valleys 42-1, 42-2, 42-$n$ constituting a tactile means for conveying information, via a touching finger, to the musician playing the instrument. Thus, each note-producing touch member produces a continuously varying pitch of sound when a finger runs up and down it, but the notes of the scale are located by notches 42 in the non-conductive ridges 40 running alongside each string as shown in FIG. 3. A series of discrete notes can be played by running a finger along a ridge so that it touches the note-producing touch member only at note intervals. On the other hand, portamento can be produced by running the finger directly along the note-producing touch member 13 with the notches 42-1, 42-2 in the ridge 40 providing tactile information feedback to the musician as his finger passes over the note intervals or notches 42-1, 42-2. Ridge 41 is also provided with a similar set of notches, indentation or valleys 43-1, 43-2, 43-$n$. Instead of (or in addition to) indentations or notches, braille may be added to convey information to the user, or bumps or other protuberances on the resistance elements 13-18 may be used to convey tactile information to the musician or a composer using the instrument.

FIG. 6 is a cross-sectional view along line 28 of FIG. 2. It shows the acoustic cavity 21 and two transducers 61 and 62 of a total of six transducers—one for each note-producing touch member.

As disclosed in my application Ser. No. 014,450, filed Feb. 23, 1979 entitled "Touch Panel System and Method", and now U.S. Pat. 4,293,734, for a one-axis system, the point on an impedance element touched by a user's finger is determined by causing electrical current to flow through the impedance element to each side of the touched point, which currents are translated to a signal corresponding to the touched point. Such a system is disclosed in FIG. 7 which illustrates a plurality of resistance elements 13', 14', 15', 16', 17' and 18' corresponding to the note-producing touch members 13-18 of FIG. 1.

Each resistance element has a pair of end points 13A-13B, 14A-14B ... 18A-18B, which are electrically coupled to a position-to-voltage circuit, the circuit arrangement being illustrated in detail with respect to resistance element 13' in FIG. 7. When the user's finger touches the element 13' a small current flows through his body impedance Z (illustrated as a lumped impedance) to the thumb control panels, and thence to a point of common circuit potential. Operational amplifiers 70 and 71 maintain the ends 13A and 13B of resistance element 13' at the same instantaneous electrical potential as the a-c output of signal generator 74 by supplying currents through feedback resistors 73 and 75, respectively.

The current through feedback resistor 75, which current is equal in magnitude and opposite in polarity to the current through $r_2$, produces a voltage that is added to the output of signal generator 74 to give an instantaneous potential at the output of operational amplifier 71:

$$v_{71} = v_{74} - i_2 R_{75} \tag{1}$$

where $v_{74}$ is the voltage output of signal generator 74, $i_2$ is the current through $r_2$, and $R_{75}$ is the resistance of the feedback resistor 75. Subtractor 78 instantaneously removes the output voltage of signal generator 74 from $v_{71}$, and rectifier 79 converts the a-c signal into a d-c level proportional to the average magnitude of current $i_2$:

$$v_2 = i_2 R_{75} \tag{2}$$

Summing (adding) circuit 80 adds level $v_2$ to level $v_1$, which is similarly derived from the current through $r_1$ by means of operational amplifier 70, substractor 81 and rectifier 82. Divider 83 divides $v_2$ by the sum $(v_1+v_2)$ to give an output voltage:

$$v_{out} = \frac{v_2}{v_1 + v_2} = \frac{i_2}{i_1 + i_2} \tag{3}$$

As demonstrated in my above-mentioned patent application Ser. No. 014,450, if the resistance element is linear, the output voltage is directly proportional to the distance of the point touched from end 13A.

The position voltage $v_{out}$ goes to voltage-to-frequency converter 90, which creates a signal whose frequency is a function of finger position. Using techniques well-known in the art of electronic circuit design, a nonlinear element may be incorporated in voltage-to-frequency converter 90 so as to produce an exponential relationship between input voltage and output frequency such that equal increments of input voltage cause equal percentage changes in output frequency. This allows the note-locating notches 42 in ridges 40 to be uniformly spaced instead of being located at logarithmically related intervals as is the case for guitar frets, etc.

The waveform of the signal from voltage-to-frequency converter 90 is modified by voicing circuit 92, using techniques well known in the electronic organ art, under the control of right thumb control panel 23 and its associated position-to-voltage circuit 105. Waveform modifications may include vibrato, echo effects, and variable attack and release as well as changes in timbre of a sustained note. Switches may be included in the instrument to select the control function of the right thumb control panel, and control knobs and foot pedals may also be used to control these waveform modifications as desired. The signal current to operate the right thumb control is supplied by one or more of the right note-producing touch members in the manner shown in FIG. 11 of my patent application Ser. No. 014,450, and the electronic circuitry associated with each note-producing touch member includes a "presence" circuit that silences the output unless the musician simultaneously touches the note-producing touch member and one of the thumb controls.

As described earlier, left thumb control panel 24 is used to control the volume for all note-producing touch members 13'-18', so the position-to-voltage converter 100 for that element is used as the gain or volume control input to audio amplifier 101, and hence, controls the volume of sound emitted by transducer 102.

Special sound effects, such as simulation of a drum, can be provided as accompaniment for the melody. As shown in FIG. 5, a set of note-producing touch members 120-122 is accompanied by an electronic drum 125. The drum is a pressure-sensitive two-axis touch panel as disclosed in my above-identified application. The X and Y coordinates are supplied to separate voicing circuits and the pressure-axis output is used to control a transient envelope produced by the voicing circuits. One of the two coordinate outputs can control the pitch of the drum, and parallel indentations in the resistance surface of the touch panel can provide tactile identification of note intervals. The instrument of FIG. 5 does not have an acoustic cavity, but instead produces sound with a separate amplifier and loudspeaker.

In the embodiment illustrated in FIG. 7, thumb control panels 23 and 24 and their respective position-to-voltage circuits are used to supply volume control for all note-producing elements 13, 14, 15, 16, 17, and 18. While in this embodiment each touch panel note-producing element is indicated as supplying a signal to a separate amplifier 101 and transducer 102, it will be appreciated that the signals from the voltage to frequency converters or the voicing circuits can be combined in an electrical mixing circuit in the same manner as an electric organ. Moreover, one or more of the touch panel elements can have the pressure sensing feature as disclosed in my application Ser. No. 014,450 filed Feb. 23, 1979, and now U.S. Pat. No. 4,293,734, so as to give the musician simultaneous control over another musical characteristic of the note such as intensity in addition to pitch.

It will be appreciated that various modifications and adaptations of the invention can be carried out by those skilled in the art without departing from the spirit and scope of the invention as set forth in the following claims:

What is claimed is:

1. A musical instrument comprising a frame member, a plurality of one axis touch panel resistance elements on said frame member extending between at least two boundaries on said frame member, an electronic circuit means connected to each of said resistance elements for locating points on said resistance elements through which points an electrical current passing through the body of the musician flows when touched by a finger of said musician and producing a signal corresponding to the pitch of a note to be played, and means for sensing pressure exerted by said finger of a musician on each said resistance element and producing a signal corresponding to said pressure, said signal corresponding to pressure being utilized to give said musician simultaneous control over another musical characteristic of the note to be played in addition to the pitch.

2. The invention defined in claim 1 including at least one transducer means for producing a musical note when one of said resistance elements is touched by said finger of said musician.

3. The invention defined in claim 1 wherein each said resistance element is extended in the direction of at least one further axis transverse to said one axis and said electronic circuit means has three or more connections to said resistance element and gives said musician simultaneous control over another musical characteristic of the note to be played in addition to pitch.

4. A musical instrument comprising a frame member, a plurality of one axis touch panel resistance elements on said frame member extending between at least two boundaries on said frame member, an electronic circuit means connected to each of said resistance elements for locating points on said resistance elements through which points an electrical current passing through the body of the musician flows when touched by a finger of said musician and producing a signal corresponding to the pitch of a note to be played, said tactile means located at one or more selected points distributed along each said resistance element for conveying information, via the touching finger, to said musician, tactile means including at least one ridge adjacent to each said resistance element, said ridge having a series of indentations therein 5. A musical instrument comprising a frame member, a plurality of one axis touch panel resistance elements on said frame member extending between at least two boundaries on said frame member, an electronic circuit means connected to each of said resistance elements for locating points on said resistance elements through which points an electrical current passing through the body of the musician flows when touched by a finger of said musician and producing a signal corresponding to the pitch of a note to be played, at least one further resistance element on said frame member, and circuit means connected to said at least one further resistance element for controlling, when touched by said musician, at least one musical characteristic of the note to be played other than the pitch, said frame member having a pair of opposing surfaces, the first said resistance elements being located on one opposing surface and said one further resistance element being located on the other opposing surface, said one further resistance element being adapted to be engaged by the thumb of the musician when at least one finger of the musician is engaging at least one said resistance element, second electronic circuit means connected to said one further resistance element for locating a point on said one further resistance element touched by said human thumb and producing a thumb control signal corresponding thereto, and means whereby said thumb control signal can modify said musical note.

6. The invention defined in claim 5 including at least one acoustic cavity in said frame member coupled to said transducer means for modifying the timbre of said musical note.

* * * * *